UNITED STATES PATENT OFFICE.

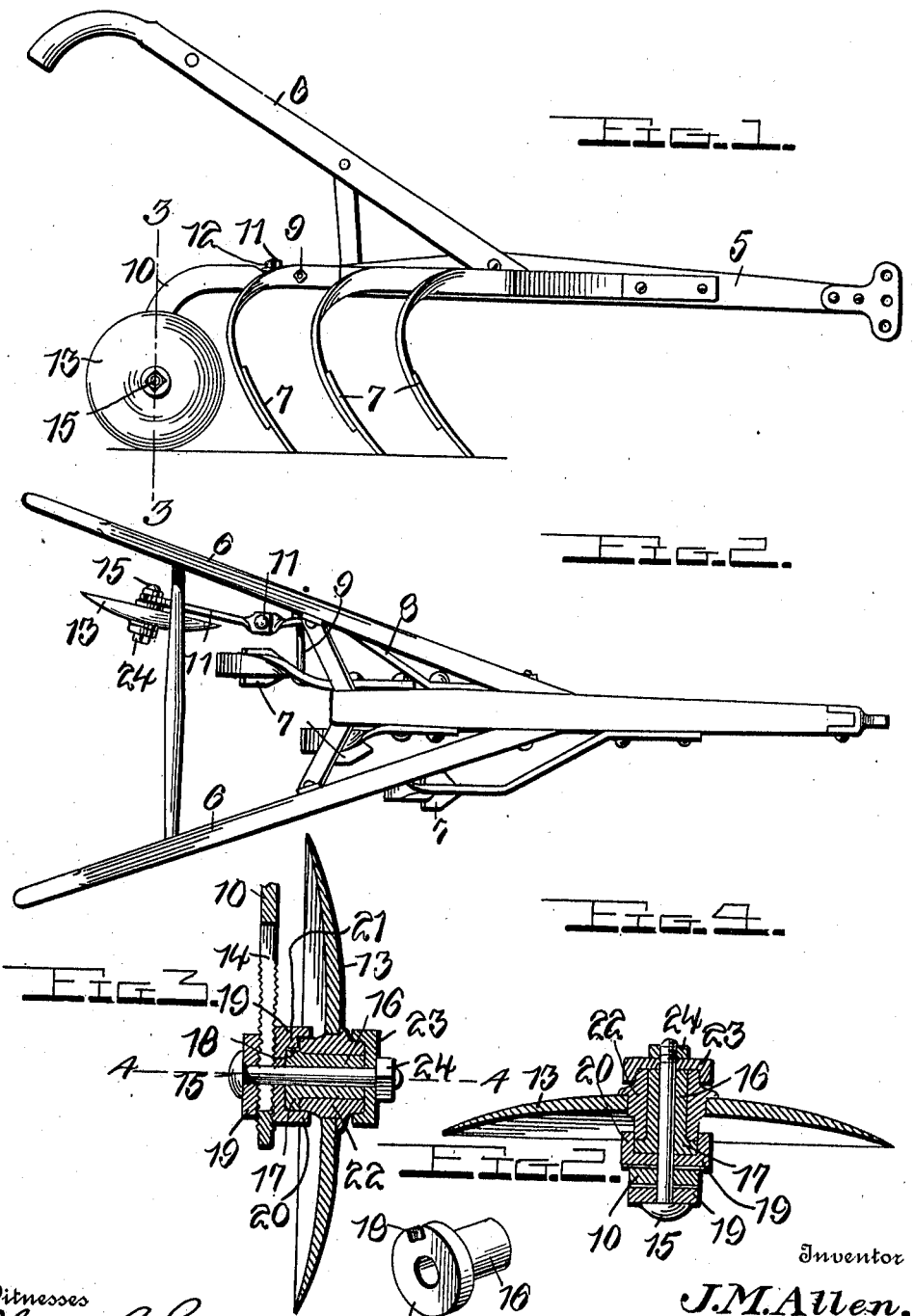

JOSEPH MITCHEL ALLEN, OF HENDERSONVILLE, NORTH CAROLINA.

CULTIVATOR.

982,921.

Specification of Letters Patent. Patented Jan. 31, 1911.

Application filed April 13, 1910. Serial No. 555,204.

*To all whom it may concern:*

Be it known that I, JOSEPH M. ALLEN, a citizen of the United States, residing at Hendersonville, in the county of Henderson and State of North Carolina, have invented certain new and useful Improvements in Cultivators, of which the following is a specification, reference being had to the accompanying drawings.

This invention relates to improvements in cultivators and more particularly to improved means for mounting the cultivator disk.

A further object is to provide a vertically and laterally adjustable disk adapted to be attached to a cultivator of the usual type employing a plurality of cultivating blades or plow feet.

A still further object is to provide a cultivating disk attachable to the ordinary spring blade cultivator, whereby the efficiency of such cultivators is greatly increased in the cultivation of plants at early periods of their growth.

With these and other objects in view, the invention consists of the novel features of construction, combination and arrangement of parts, hereinafter fully described and claimed, and illustrated in the accompanying drawings, in which, Figure 1 is a side elevation of a cultivator having my improved cultivating disk attached thereto; Fig. 2 is a top plan view; Fig. 3 is an enlarged section taken on the line 3—3 of Fig. 1, and Fig. 4 is a section taken on the line 4—4 of Fig. 3.

Referring more particularly to the drawings, 5 indicates a cultivator beam to the opposite sides of which the usual handles 6 are secured. A plurality of cultivator blades 7 are carried by the beam 5, and may be secured thereto in any preferred manner. In the type of cultivator illustrated in the accompanying drawings four such cultivator blades 7 are employed, said blades being disposed in different longitudinal and transverse planes. These blades, in the use of the implement are adapted to distribute the earth about the roots of the plants, and to dig up the weeds which grow between the plant rows. Very often, however, the plants are destroyed as it is necessary in order to properly cultivate the same that the blades be positioned close to the plants so as to loosen the soil at their roots. In the present instance, I dispense with one of the cultivating blades 7, and in lieu thereof use a rotatable disk which is of concavo-convex form, and not only loosens the soil, but directs the same inwardly upon the plant roots and about the stalks thereof, whereby the liability of removing the soil from the roots is eliminated. To the above end, I employ a supporting bar or brace 8 which is inclined rearwardly, and laterally from one side of the plow beam 5 and is connected by means of a transverse bar or rod 9 to the rear cultivator blade 7. To the end of the bar 8 the disk-carrying arm 9 is adjustably pivoted, the pivot bolt 11 extending through the end of said arm and the brace bar 8. Upon the end of the pivot bolt the nut 12 is threaded, and is adapted to secure the arm 10 against movement. In this manner, the disk 13 rotatably mounted upon the end of the arm 10 may be readily adjusted with relation to the line of movement of the implement to depress the cultivating disk and the blade 7 upon opposite sides of the plant row. The lower end of the arm 10 is provided with a longitudinal slot 14, through which the disk-carrying bolt 15 extends. Upon this bolt a spindle 16 is arranged and is formed upon one end with an annular flange 17 which is notched or recessed, as shown at 18. Upon opposite sides of the arm 10 a collar 19 is disposed upon the disk-carrying bolt 15. The opposed faces of the collars 19 are roughened or knurled to bite into the arm 10. One of the collars 19 is formed with an annular flange 20 within which the flange 17 is depressed. The flange 20 has formed thereon a lug 21 which is adapted to be received in the recess 18 formed in the spindle flange 17, whereby said spindle is held against independent movement upon the disk-carrying bolt 15. The disk is provided with a central hub 22 which is adapted to be disposed over the spindle 16, and against the flange 17 thereof. Upon the outer end of the bolt 15 a flanged collar 23 is disposed, the flange thereof engaging over the disk hub 22. A nut 24 is then threaded upon the end of the bolt 15 in binding engagement upon the face of the collar, whereby the collars and the spindle are secured upon the bolt 15, the disk 13 having free rotation upon said spindle. A scraper arm 25 may be provided and is engaged over the end of the disk-supporting bolt or axle to be secured thereon by means of the nut 24.

From the above it will be seen that the disk may be readily adjusted upon the end of the arm 10 to regulate the depth to which the same cuts into the earth.

By adjusting the disk transversely upon the end of the supporting bar 8, the earth may be thrown in the proper direction to dispose the same about the roots of the plants, at the same time thoroughly agitating the soil and thus cultivating the early growth of the plants.

From the foregoing it will be seen that I have provided a very simple and efficient mounting for the cultivator disk and means for attaching the same to the cultivator whereby it may be readily adjusted.

While I have shown and described the preferred embodiment of my invention, it will be understood that the same is susceptible of many minor modifications without departing from the essential features, or sacrificing any of the advantages thereof.

Having thus described my invention, what I claim is:

1. In a cultivator, the combination with a beam, of a supporting bar carried thereby, and extending rearwardly of the beam, a disk-carrying arm pivotally connected to said bar and transversely adjustable thereon to position the disk relative to the line of movement of the cultivator, the cultivating disk being slidable on the end of said arm, and means for securing the disk in its adjusted position.

2. In a cultivator, the combination with a beam of a transversely and rearwardly extending supporting bar secured to said beam, a rearwardly and downwardly extending disk-carrying arm pivotally connected to said bar and adapted to have transverse adjustment thereon with relation to the line of movement of the cultivator, a cultivating disk vertically movable on the arm, and means for securing the disk in its adjusted position.

In testimony whereof I hereunto affix my signature in the presence of two witnesses.

JOSEPH MITCHEL ALLEN.

Witnesses:
J. S. HULBERT,
W. F. BROWN.